US009842166B1

(12) United States Patent
Leviathan et al.

(10) Patent No.: US 9,842,166 B1
(45) Date of Patent: Dec. 12, 2017

(54) SEMI STRUCTURED QUESTION ANSWERING SYSTEM

(71) Applicant: GOOGLE INC., Mountain View, CA (US)

(72) Inventors: Yaniv Leviathan, Tel Aviv (IL); Eyal Segalis, Tel Aviv (IL); Yoav Tzur, Tel Aviv (IL); Gal Chechik, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 497 days.

(21) Appl. No.: 14/455,142

(22) Filed: Aug. 8, 2014

(51) Int. Cl.
*G06F 17/30* (2006.01)

(52) U.S. Cl.
CPC .. *G06F 17/30864* (2013.01); *G06F 17/30958* (2013.01)

(58) Field of Classification Search
USPC .......................................... 707/709, 716, 726
See application file for complete search history.

(56) References Cited

U.S. PATENT DOCUMENTS

| 8,533,203 | B2 | 9/2013 | Chaudhuri et al. | |
|---|---|---|---|---|
| 2004/0003132 | A1* | 1/2004 | Stanley | G06F 17/30286 719/316 |
| 2007/0288246 | A1* | 12/2007 | Ebert | G06Q 30/02 715/780 |
| 2010/0325151 | A1* | 12/2010 | Heuer | G06F 17/30961 707/769 |
| 2011/0196852 | A1* | 8/2011 | Srikanth | G06F 17/3066 707/706 |
| 2011/0307435 | A1* | 12/2011 | Overell | G06F 17/278 706/46 |
| 2012/0136863 | A1 | 5/2012 | Bobick et al. | |
| 2013/0254213 | A1* | 9/2013 | Cheng | G06Q 50/01 707/748 |
| 2013/0254303 | A1* | 9/2013 | Cheng | H04L 51/32 709/206 |

(Continued)

OTHER PUBLICATIONS

Berant, et al., "Semantic Parsing on Freebase from Question-Answer Pairs", Empirical Methods in Natural Language Processing (EMNLP), 2013, 12 pages.

(Continued)

*Primary Examiner* — Hanh Thai
(74) *Attorney, Agent, or Firm* — Brake Hughes Bellermann LLP

(57) ABSTRACT

In one example embodiment, a computer system includes at least one processor and a memory storing a data graph and instructions. The instructions, when executed by the at least one processor, cause the system to generate a template sentence based on a fact including a first node, a second node and a string, wherein the first node and the second node exist in the data graph and the string represents a fact that is absent from the data graph, search the internet for a document including the template sentence, and upon determining the internet includes the document with the template sentence, infer the fact by generating a series of connections between nodes and edges of the data graph that together with the first node and the second node are configured to represent the fact, the series of connections defining a path, in the data graph, from the first node to the second node.

19 Claims, 8 Drawing Sheets

(56) References Cited

U.S. PATENT DOCUMENTS

2013/0254305 A1* 9/2013 Cheng .................. H04L 51/32
709/206

OTHER PUBLICATIONS

Bollegala, et al., "Mining for Analogous Tuples from an Entity-Relation Graph", Proceedings of the Twenty-Third International Joint Conference on Artificial Intelligence, 2013, 7 pages.
Fader, et al, "Paraphrase-Driven Learning for Open Question Answering", The 51st Annual Meeting of the Association for Computational Linguistics, Aug. 4-9, 2013, 11 pages.
Lin, et al, "DIRT—Discovery of Inference Rules from Text", Proceedings of the seventh ACM SIGKDD international conference on Knowledge discovery and data mining, 2001, 6 pages.

* cited by examiner

300

Search: | Who is the grandfather of Karina Jones? | Go

Zach Jones – Wikipedia, the free encyclopedia
en.wikipedia.org/wiki/Zach_Jones
Until 1995, Zach Brown was the richest person in America. As the CEO of Acme Corporation, he was most well ...

Zach Jones Biography – Facts, Birthday, Life Story – Biography.com
www.biography.com > People
Zach Jones was a business man and CEO of Acme Corporation who made his fortune during the chaos ....

Zach Jones – Biography - IMDb
Www.imdb.com/name/nm0024907/bio
Mini Biography. Zachary William Jones was born in the Philippines just before the second world war, although ...

310

Zach Jones

Zach Jones was the CEO of Acme Corporation from 1971 to 1979. Brown was instrumental in changing the image of the company during...
Wikipedia Born: Manila, Philippines Died: August 16, 2003, Springfield Height 6' 4" (1.93m)

Married: Susan Mills, 1952

Children: Jeff Jones, Nancy Brown, Karina Jones, Carl Jones, More...

SEMI STRUCTURED QUESTION ANSWERING SYSTEM

BACKGROUND

Embodiments relate to relational models of knowledge, such as a graph-based data store, can be used to provide answers to search queries. Such models describe real-world entities (people, places, things) as facts in the form of graph nodes and edges between the nodes. While such graphs may represent a significant amount of facts, even the largest graphs may be missing tens of millions of facts, or may have incorrect facts. For example, relationships, edges or other attributes between two or more nodes can often be missing.

SUMMARY

Facts and/or attributes missing from a relational model of knowledge often can be inferred based on other related facts (or elements of facts) in the graph. For example, a search system may learn that an individual's grandfather is a male parent of a parent. Accordingly, the system can determine with high confidence that an individual's grandfather, even though there is no grandfather edge between nodes, is most likely a parent of a parent (given that there is a parent edge between nodes) with an additional check the parent of the parent is male. While this example uses one piece of supporting evidence (called a feature), inferring an individual's grandfather, functions estimating missing facts are often more complex and can be based on several, even hundreds, of such features. Once the facts and/or attributes missing from a relational model of knowledge can be inferred, queries based on the facts and/or attributes missing from a relational model of knowledge can be resolved.

Accordingly, according to one example implementations, in a first component or element (e.g., pre-processing or before executing a query), missing facts and/or attributes may be determined. And, in a second component or element (e.g., processing time or while executing a query) answers to a query based on the missing facts and/or attributes may be determined. However, example embodiments are not limited thereto. For example, both components could be implemented offline (e.g., pre-processed), or both online (e.g., while the system is operational), or one online and one offline.

In one example embodiment, a computer system includes at least one processor and a memory storing a data graph and instructions. The instructions, when executed by the at least one processor, cause the system to receive a query based on a first node of the data graph and a fact that is absent from the data graph, determine an answer to the query by following a path starting at the first node and ending at a second node, the path including at least one third node between the first node and the second node, and return a property associated with the second node as the answer to the query.

These and other aspects can include one or more of the following features. For example, the path can be based on an attribute of the first node. The path can be defined by a series of connections between the first, second, and third nodes of the data graph and edges between the first, second, and third nodes of the data graph. For example, the determining of the answer can include determining an attribute of the first node associated with the query, determining the attribute is absent from the data graph, determining a series of connections between nodes and edges of the data graph, wherein the series of connections defines the path from the first node to the second node, and determining the absent fact based on the defined path.

For example, the query can be formatted as a question based on a fact and the first node, and the fact can link the first node to the second node. The instructions, when executed by the at least one processor, can cause the system to display the fact associated with the answer.

In one example embodiment, a computer system includes at least one processor and a memory storing a data graph and instructions. The instructions, when executed by the at least one processor, cause the system to generate a template sentence based on a fact including a first node, a second node and a string, wherein the first node and the second node exist in the data graph and the string represents a fact that is absent from the data graph, search the internet for a document including the template sentence, and upon determining the internet includes the document with the template sentence, infer the fact by generating a series of connections between nodes and edges of the data graph that together with the first node and the second node are configured to represent the fact, the series of connections defining a path, in the data graph, from the first node to the second node.

These and other aspects can include one or more of the following features. For example, the search of the internet for the document can include crawling the internet to read a sentence in each of a plurality of documents, parsing the sentence, determining if an attribute associated with the first node and an attribute associated with the second node exist in the sentence, upon determining the attribute associated with the first node and the attribute associated with the second node exist in the sentence, determine if the first node and the second node are linked based on the template sentence, and upon determining the first node and the second node are linked based on the template sentence, the internet is determined to include the document with the template sentence.

For example, the search of the internet for the document can include crawling a plurality of documents stored in the memory that are associated with documents on the internet to read a sentence in each of a plurality of documents, parse the sentence, determine if the parsed sentence matches the template sentence, determine if an attribute associated with the first node and an attribute associated with the second node exist in the sentence, and upon determining the parsed sentence matches the template sentence and the attribute associated with the first node and the attribute associated with the second node exist in the sentence, infer the fact based on the parsed sentence.

For example, the search of the internet for the document can include generating a parse tree associated with a sentence read from a document on the internet, searching the parse tree for the first node and the second node, and determining if the first node and the second node are linked based on the template sentence. The fact can describe the first node, the second node and an edge absent from the data graph.

The instructions, when executed by the at least one processor, can cause the system to traverse the data graph to find a plurality of paths from the first node to the second node and select one of the plurality of paths as the path. The selecting of the path can be based on at least one of a number times that the path repeats, a length of the path, a type of node traversed, and an abundance of the path relative to shorter paths. For example, the document can include a file that stores content. The instructions, when executed by the at least one processor, can cause the system to verify the series of connections using a query based on the fact and one of the first node and the second node. The instructions, when executed by the at least one processor, can cause the system to first receive a query based on the fact, second receive one of the first node and the second node as a variable associated with the query, third receive the other of the first node and the second node as an answer to the query, traverse the data graph using the series of connections to determine if the answer to the query is the other of the first node and the second node, repeat the second receiving, the third receiving and the traversing steps a number of times, and verify the series of connections between nodes and edges of the data graph as acceptable if the answer to the query is the other of the first node and the second node is at least a threshold number.

For example, the instructions, when executed by the at least one processor, cause the system to receive a query based on based on the fact including one of the first node and the second node from an external system, determine if the fact exists in the data graph and upon determining the fact does not exist in the data graph, returning an answer using the series of connections.

In one example embodiment, a method includes generating a template sentence based on a fact including a first node, a second node and string, wherein the first node and the second node exist in a data graph and the string represents an edge that is absent from the data graph, searching the internet for a document including the template sentence, upon determining the template sentence is in the document, determine a relationship between the first node and the second node, and inferring the edge based on the relationship by generating a series of connections between nodes and edges of the data graph that together with the first node and the second node are configured to represent the fact, the series of connections defining a path, in the data graph, from the first node to the second node.

These and other aspects can include one or more of the following features. For example, the search of the internet for the document can include crawling at least one of the internet and a plurality of documents stored in the memory that are associated with documents on the internet to read at least one sentence parsing the sentence, determining if the parsed sentence matches the template sentence, determining if an attribute associated with the first node and an attribute associated with the second node exist in the sentence, and upon determining the parsed sentence matches the template sentence and the attribute associated with the first node and the attribute associated with the second node exist in the sentence, determining if the first node and the second node are linked by an attribute based on the fact. For example, the method can include traversing the data graph to find a plurality of paths from the first node to the second node, and selecting one of the plurality of paths as the path.

The details of one or more implementations are set forth in the accompanying drawings and the description below. Other features will be apparent from the description and drawings, and from the claims.

BRIEF DESCRIPTION OF DRAWINGS

FIG. 3 illustrates an example of a user interface a search result enhanced with an estimate explanation, in accordance with an implementation.

Like reference symbols in the various drawings indicate like elements.

DETAILED DESCRIPTION

Figure 1:
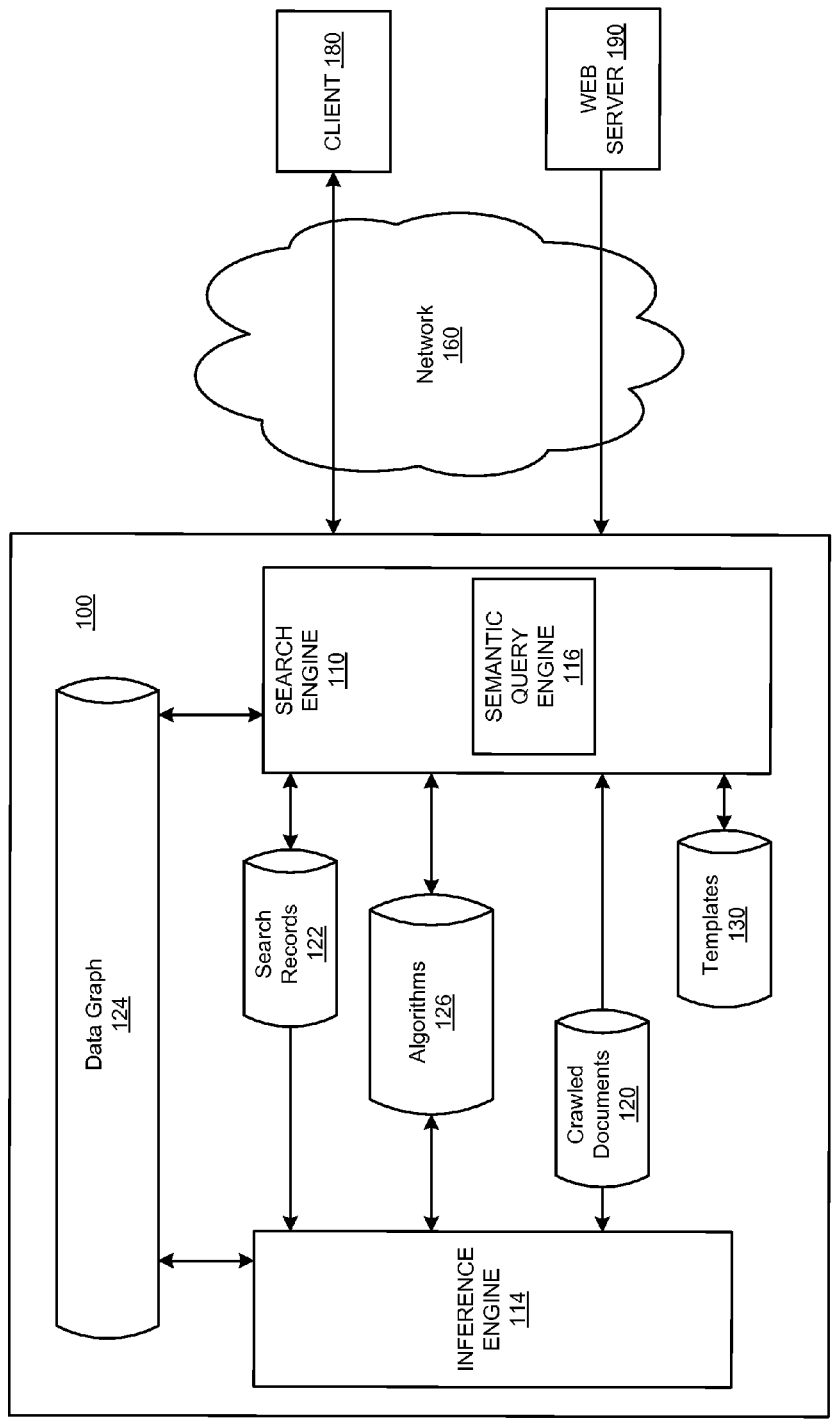
FIG. 1 illustrates an example system in accordance with the disclosed subject matter.

FIG. 1 is a block diagram of semi structured question answering system in accordance with an example implementation. The semi structured question answering system 100 (hereinafter referred to as system 100 or computer system 100) may be used to infer information in a data graph based on other related facts, attributes and/or properties in the data graph. The information may be used to answer questions where the answer to a question is not directly stored in the graph. A node may be a noun (e.g., a person) in the data graph. An edge may be a relationship (e.g., occupation, parent, location) between nodes. A fact may be a statement that includes a first node, an edge, and a second node. An attribute could be referred to as a relationship (e.g., the edge between two nodes) for a fact. However, an attribute may also be a property of a node (e.g., name of the person).

For example, a node may correspond to a fact describing a parent-child relationship. For example, baseball player Bob Boone is the son of baseball player Ray Boone and the father of baseball players Aaron Boone and Bret Boone. Accordingly, the data graph may include an entity as a node corresponding to Bob Boone, which may include an edge for a parent relationship directed to Ray Boone and two edges for child corresponding, respectively, to Aaron Boone and Bret Boone. The entity or node may also be associated with a fact or an attribute that includes an edge (e.g., occupation) between Bob Boone as a node and baseball as a node. Alternatively, the node Bob Boone may include an attribute as a property (e.g., occupation) set to baseball.

However, there may be no edge in the entity (or the graph as a whole) corresponding to a grandparent relationship. Therefore, the relationship between Ray Boone and Aaron Boone may not be shown in the graph. However, the relationship between Ray Boone and Aaron Boone may inferred from the graph so long as the question answering system knows (i.e., has been instructed accordingly) that there is such an entity as a grandparent.

The inference may be based on the joint distribution of one or more features, which represent facts in the data graph that are related to the missing information. The system 100 may also be used to store the inferences (e.g., as functions or algorithms) and the semantically structured sentence (e.g., X is the attribute of Y) used to generate the inference. It then uses these entities to map new string that corresponds to relationships between nodes. By that system 100 may be configured to learn new edges between existing nodes in the data graph. In some implementations, the system 100 can generate an inference and its algorithm from a very large data graph, e.g., one with millions of entities and even more edges. The algorithm (or function) can include a series of connections between nodes and edges of the data graph. Accordingly, the algorithm can represent an attribute as an edge in a fact. The algorithm (or function) can also include a check of a property of a node (e.g., a gender property is male). While system 100 in FIG. 1 is described as an Internet search system, other configurations and applications may be used. For example, the system may be used in any circumstance where estimates based on features of a joint distribution are generated.

Figure 6:
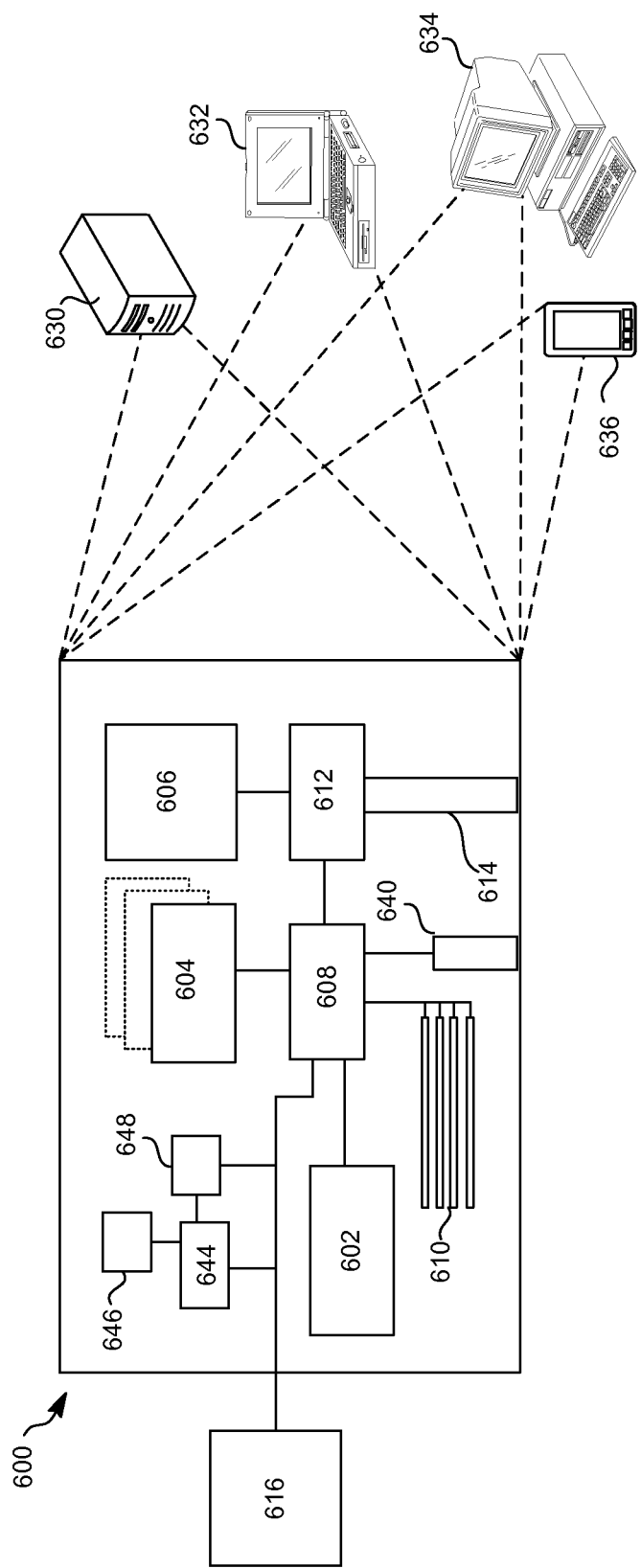
FIG. 6 shows an example of a computer device that can be used to implement the described techniques.
Figure 7:
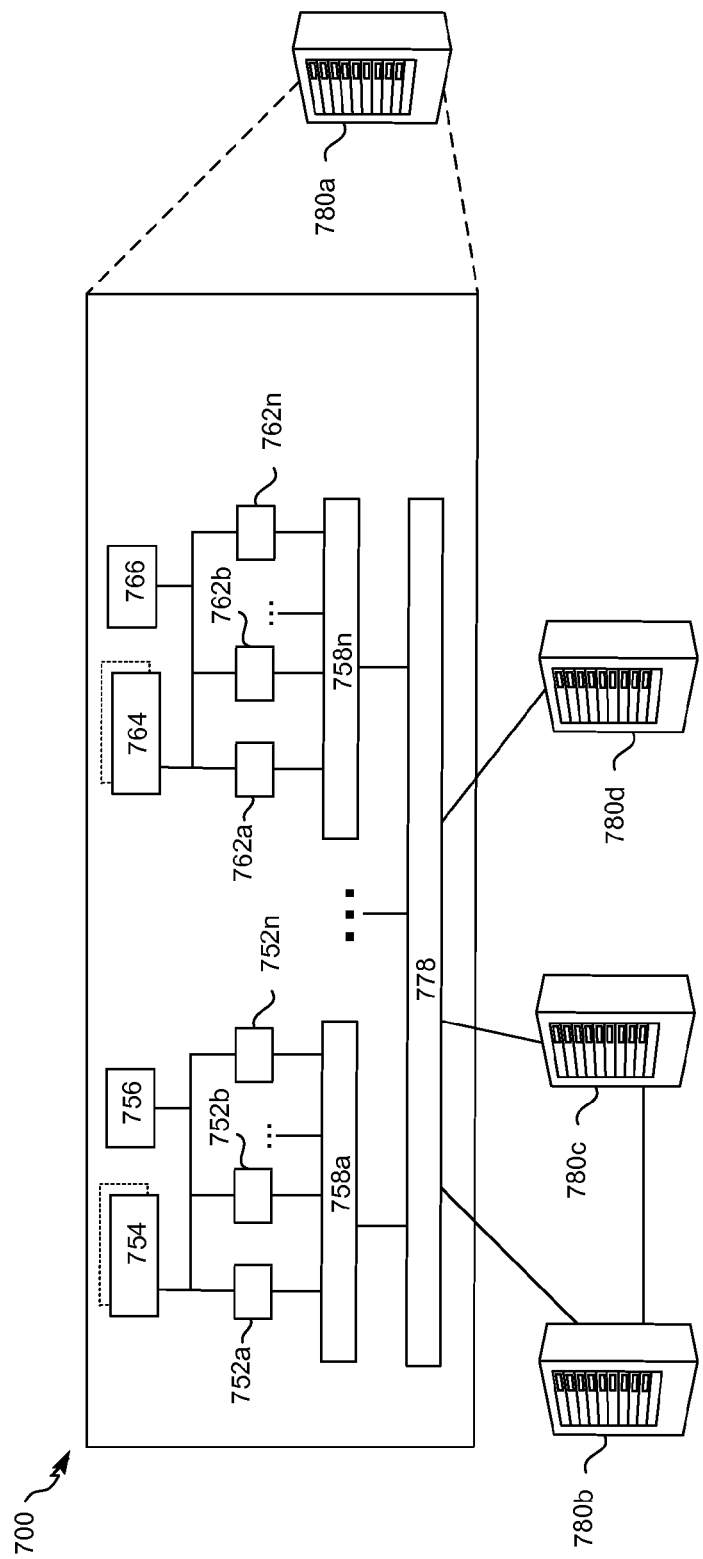
FIG. 7 shows an example of a distributed computer device that can be used to implement the described techniques.

The system 100 may be a computing device or devices that take the form of a number of different devices. For example, the system 100 may be a server, a group of such servers, a client-server system, or a rack server system. In addition, system 100 may be implemented in a personal computer, for example, a laptop computer. The system 100 may be an example of computer device 600, as depicted in FIG. 6, or computer device 700, as depicted in FIG. 7.

The system 100 may include a data graph 124. The data graph 124 can be a directed edge-labeled graph. Such a data graph stores nodes and edges. The nodes in the data graph represent an entity, such as a person, place, item, idea, topic, abstract concept, concrete element, attribute of another entity, other suitable thing, or any combination of these. Entities in the data graph may be related to each other by edges, which represent relationships between entities. For example, the data graph may have an entity that corresponds to the person Zach Jones and the data graph may have a child relationship between the Zach Jones entity and entities representing the children of Zach Jones. Thus, the fact that Zach Jones has a child is recorded in the data graph in the form of entities and relationships between entities. The data graph may also store attributes for an entity, for example an edge of birthdate that links an entity with a date. The date may or may not be considered a separate entity. This is another way the data graph may store facts. A data graph with a large number of entities and even a limited number of relationships may have billions of connections. In some implementations, data graph 124 may be stored in an external storage device accessible from system 100. In some implementations, the data graph 124 may be distributed across multiple storage devices and/or multiple computing devices, for example multiple servers.

Although not shown in FIG. 1, the system 100 can include one or more processors (e.g., silicon-based hardware processors) configured to execute one or more machine executable instructions or pieces of software, firmware, or a combination thereof. The system 100 can also include an operating system and one or more computer memories, for example, a main memory, cache, flash, or disk, configured to store one or more pieces of data, either temporarily, permanently, semi-permanently, or a combination thereof. The memory may include any type of storage device that stores information in a format that can be read and/or executed by the one or more hardware processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include a search engine 110, an inference engine 114, and a semantic query engine 116, among others. The search engine 110 may search the data graph 124 in addition to other document corpora in responding to a search request. For example, the search engine 110 may also be capable of searching a corpus of crawled documents 120 in addition to the data graph 124. Crawled documents 120 may include an index for searching for terms or phrases within a corpus of documents. In some implementations the corpus may be documents available on the Internet. Documents may include any type of file that stores content, such as sound files, video files, text documents, source code, news articles, blogs, web pages, PDF documents, spreadsheets, etc. In some implementations, crawled documents 120 may store one-dimensional posting lists that include phrases, terms, or document properties as posting list values and, for each posting list value, identifiers for documents related to the phrase or term. While an index for crawled documents 120 has been described as using posting lists, the index may have some other known or later developed format.

The system 100 may also include search records 122. Search records 122 may include search logs, aggregated data gathered from queries, or other data regarding the date/time and search terms of previously processed queries. In some implementations, the search records 122 may be generated by search engine 110 in the normal process of generating search results. The data graph 124, crawled documents 120, and search records 122 are stored on tangible computer-readable storage devices, for instance disk, flash, cache memory, or a combination of these, configured to store data in a semi-permanent or non-transient form. In some implementations graph-based data store 124, crawled documents 120, and search records 122 may be stored in a combination of various memories and/or may be distributed across multiple computing devices.

In some implementations, the system 100 may include an indexing engine (not shown) that includes one or more processors configured to execute one or more machine executable instructions or pieces of software, firmware, or a combination thereof to create and maintain data graph 124 and/or crawled documents 120, etc. The indexing engine may obtain content from, for example, one or more servers 190, and use the content to maintain data graph 124 and/or crawled documents 120. In some implementations, the servers 190 may be web servers, servers on a private network, or other document sources that are accessible by the indexing engine. The indexing engine may be one or more separate computing devices, such that graph-based data store 124 is maintained by a first set of computing devices and crawled documents 120 is maintained by a second set of computing devices, etc.

The search engine 110 may include one or more computing devices that use the data graph 124 and/or crawled documents 120 to determine search results for queries, for example, using conventional or other information retrieval techniques. Search engine 110 may include one or more servers that receive queries from a requestor, such as client 180, and provide search results to the requestor. Search results may include information from documents responsive to the query, information (e.g., facts) from relationships and entities in the data graph 124, and/or an estimate for information absent from the graph along with an explanation of the estimate. In some implementations, the search engine 110 may include a ranking engine that identifies documents responsive to the query from crawled documents 120 and calculates scores for the documents responsive to the query, for example, using one or more ranking signals. The ranking engine may rank the documents found responsive to the query using the scores.

In some implementations, the modules may include an inference engine 114. The inference engine 114 determines that requested information is missing from the data graph 124 and may provide an inference for the missing information. The requested information may be requested in a query, or may be determined to of the type of information often requested in queries. For example, the inference engine 114 may analyze search records 122 to determine what kinds of information query requestors have often requested in the past (e.g., like birthdates, spouses, song or movie release dates, etc.) and use this information to generate algorithms for these kinds of information based on nodes in the data graph 124. Of course, the inference engine 114 may also include other methods of finding missing information, for example using an entity type to determine what attributes entities of the entity type have and look for missing attributes for entities of the entity type. For example, a musical band entity may have a number of band members, so the inference engine 114 may look for entities that are people that are musicians and generate an algorithm to determine an instrument played by each of the band members, etc. For example, the Beatles may have a band member named Ringo Starr. The algorithm may be configured to determine that Ringo Starr plays drums. Therefore, the inference engine 114 may infer that Ringo Starr plays drums for the Beatles.

In some implementations, the inference engine 114 may generate an inference about missing information using an algorithm 126. The algorithm 126 may include a mechanism by which an inference can be made. For example an algorithm 126 may be based a number of edges to traverse and/or a fact associated with an entity. For example, continuing the grandparent example, an algorithm 126 to determine a grandparent for a person may include traversing each of the person's parent nodes and then traversing each of the parents' parent nodes. This algorithm may be modified to determine a grandfather by checking a fact (e.g., gender=male) associated with each found node. Other modifications can be contemplated, for example, living grandfather could include checking for a death fact.

Figure 2:
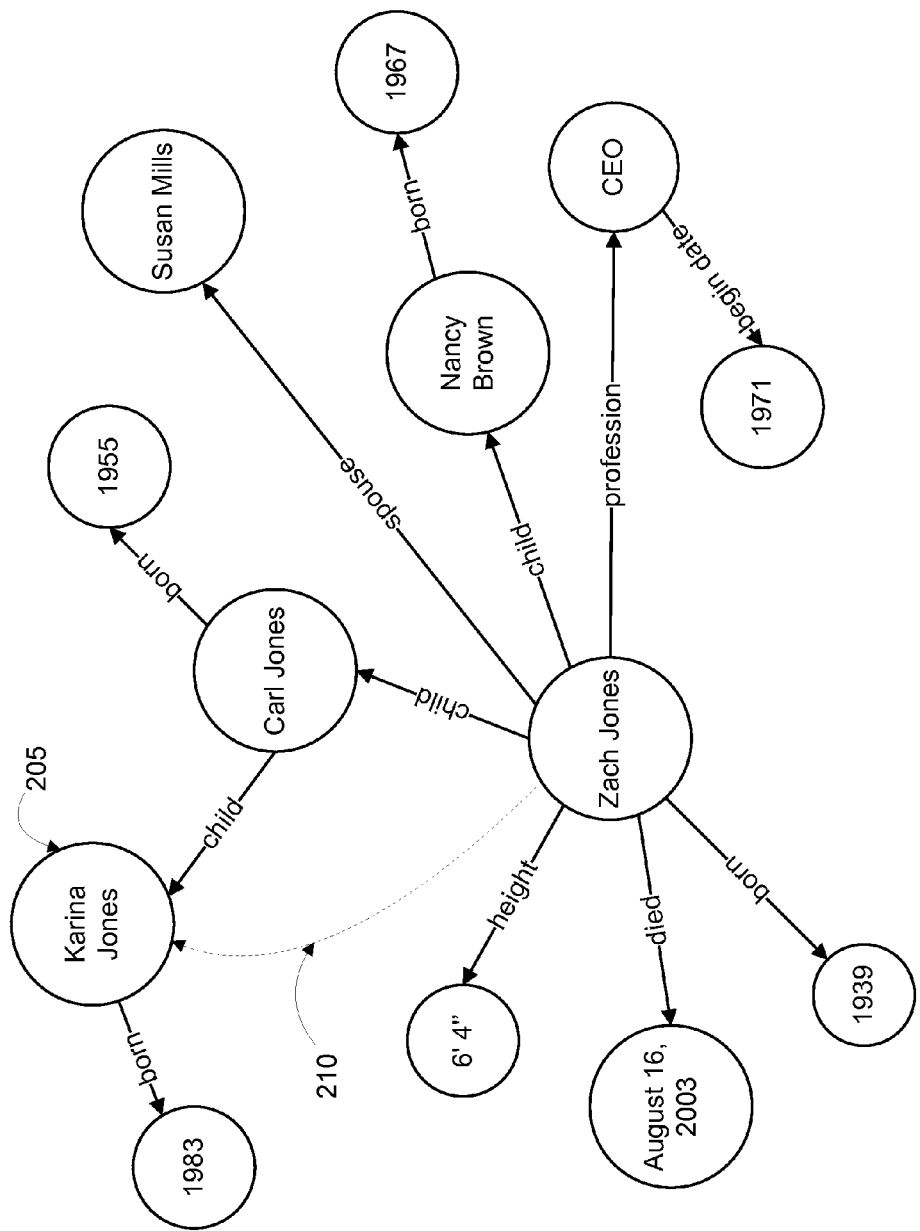
FIG. 2 illustrates an example of entities and relationships in a data graph.

In some implementations, the inference engine 114 may run periodically, looking for missing information in the data graph 124 and generating an inference for the missing information. In such implementations, the inference engine 114 may store an algorithm based on the inference. In some implementations, the inferences and related information can be stored in a file or database. In some implementations, the inference engine 114 may store the inference and the features used to generate the estimate in the data graph 124 itself, or a separate data graph that links to the data graph 124. FIG. 2 illustrates an example of a (partial) data graph 124. In the example of FIG. 2, the entity Zach Jones is a person entity. The inference engine 114 may use the algorithm 126 to determine an inferred relationship (e.g., an inferred edge) based on, for example, an existing edge (e.g., child. Once the inference engine 114 has generated and/or read an algorithm that represents the inference, the inference engine 114 may virtually (e.g., calculate by the algorithm when needed) link the entity 205 (e.g., Karina Jones) with an inferred relationship 210 to the Zach Jones entity. In some implementations, the inference engine 114 may store each semantically structured sentence (e.g., X is the attribute of Y) used to generate the inferred relationship 210.

In some implementations, the inference engine 114 may select only a subset of the inferences for storage and/or algorithm generation, for example, in association with the data graph 124. For example, the inference engine 114 may select algorithms based on semantically structured sentence(s) it determines to be strong inferences, or highly likely to generate the expected answer to a question. The stored features may then be used at a later time for inclusion in an explanation of the estimate. In some implementations, the inference engine 114 may store all features used to generate the inferred relationship 210 and selection of the subset of features used in an explanation may be done at a later time, e.g., at query time.

In some implementations, the search engine 110 may include a semantic query engine 116 that generates a semantically structured sentence (e.g., X is the attribute of Y). In some implementations, the semantic query engine 116 may use templates 130 to generate the semantically structured sentence (e.g., X is the attribute of Y), although other methods can be used. The semantic query engine 116 or the search engine 110 may provide the result of a search result to the inference engine 114 in order to generate an algorithm 126. The template 130 and/or semantically structured sentence used by the semantic query engine 116 may be generated by a user or administrator of system 100.

In some implementations, the search engine 110 uses a semantically structured sentence to mine relationships from the web. For example, the search engine 110 may search documents available on the Internet. Documents may include any type of file that stores content, such as sound files, video files, text documents, source code, news articles, blogs, web pages, PDF documents, spreadsheets, etc. The documents may also include previously crawled documents stored as crawled documents 120. The search of the documents may include a lexical analysis of the documents based on the semantically structured sentence in order to determine the meaning of the semantically structured sentence (e.g., X is the attribute of Y). For example, a lexical analysis of semantically structured sentence may be X is the grandfather of Y may indicate that there is a familial relationship between X and Y. The answers to this familial relationship may then be stored (e.g., as search records 122).

The search engine 110 may search the data graph 124 or a subset of the data graph 124 (e.g., based on known familial edges (e.g., spouse or child)) to find an edge link, a series of edge links relating X and Y, and/or a fact(s) corresponding to the relationship. Each edge link or series of edge links relating X and Y may be converted to an algorithm 126 by the inference engine 114. The search engine 110 may then use the algorithm 126 to search the data graph 124 using a question based on the semantically structured sentence (e.g., who is the grandfather of X). If a significant number (e.g., 85% to 95%) of the results of a search of the data graph 124 for a significant number of X's (e.g., Karina Jones) returns a correct Y (e.g., Zach Jones), then there is a high (or relatively high) confidence that using the algorithm will generate a correct answer.

System 100 may be in communication with client(s) 180 over network 160. Clients 180 may allow a user to submit queries to and receive a search result from search engine 110. Network 160 may be, for example, the Internet, or the network 160 can be a wired or wireless local area network (LAN), wide area network (WAN), etc., implemented using, for example, gateway devices, bridges, switches, and/or so forth. Via the network 160, the system 100 may communicate with and transmit data to/from clients 180. In some implementations, system 100 may be in communication with or include other computing devices that provide updates to the data graph 124 and/or to the crawled documents 120. For example, system 100 may include or be in communication with an indexing engine that crawls web server(s) 190 for documents and indexes the contents of the documents. The system 100 represents one example configuration and implementations may incorporate other configurations. For example, some implementations may combine one or more of the search engine 110, the inference engine 114, and the semantic query engine 116 into a single module or engine. As another example, elements of the search engine 110, the inference engine 114 and the semantic query engine 116 may be distributed across different computing devices. For example, the elements of the search engine 110 may be distributed across a root computing device and one or more servers that store the data graph 124 and/or the crawled documents 120.

FIG. 3 illustrates an example of a user interface 300 illustrating an inferred search result based on an association with other related facts in the data graph, consistent with disclosed implementations. A search engine, such as search engine 110 of FIG. 1, may generate information used to display user interface 300 in responding to a request to show search results for a query that requests a specific piece of information about an entity (e.g., a target entity) in the graph-based data store. The user interface 300 may include search results 305 from the graph-based data store. The search results 305 may represent facts about an entity for which there is no direct answer to the search or relationship in the data graph associated with the search. In the example of FIG. 3, the query requested the grandfather of Karina Jones, but the information from the data graph alone does not include a mechanism to determine this information. However, the search engine can be enhanced with an algorithm used to determine this information based on information in the data graph. The user interface 300 may also include search result 310 from a document source. The search result 310 may thus represent documents determined to be responsive to the terms of the query.

Figure 4A:
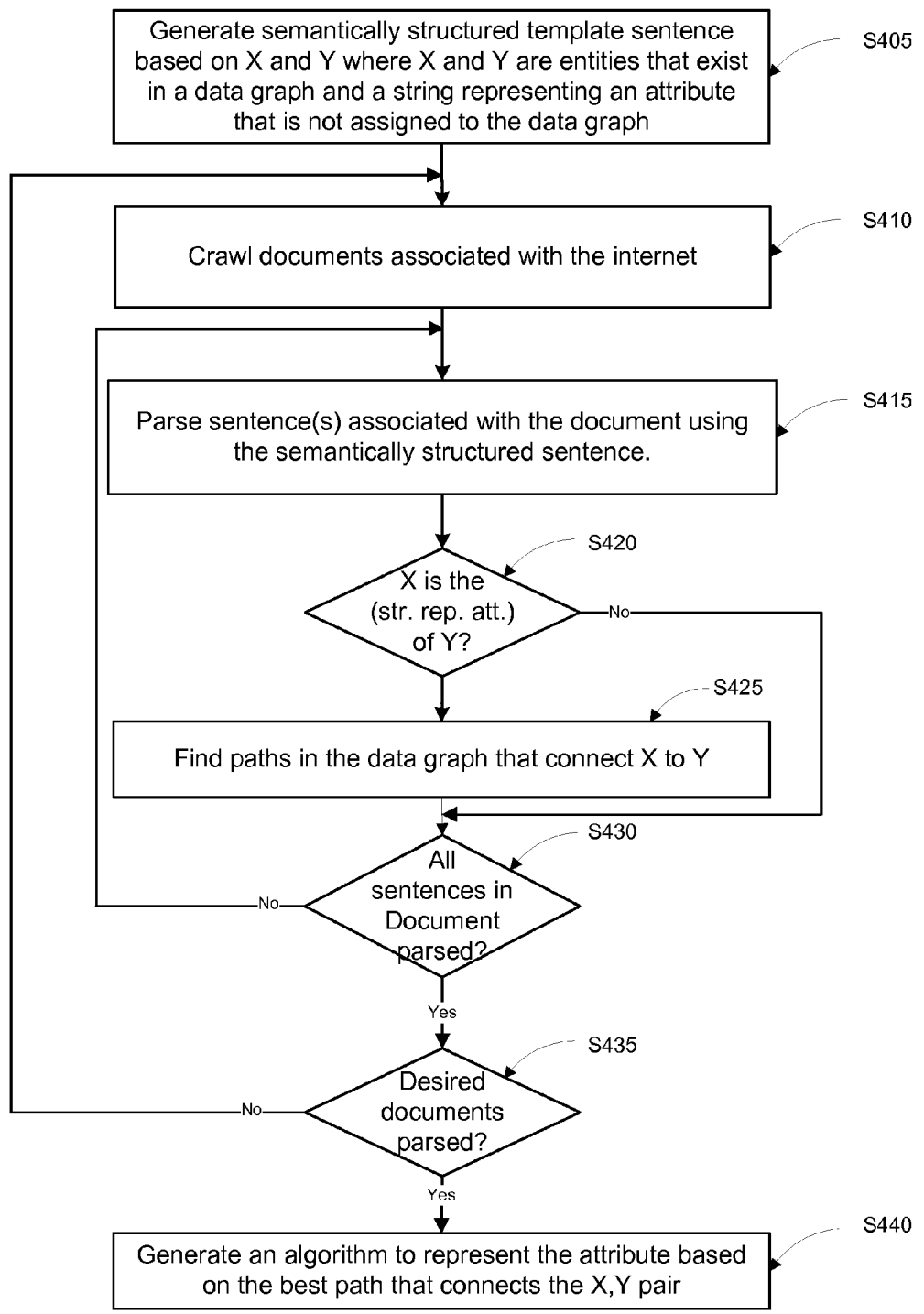
FIG. 4A illustrates a flow diagram of an example process for providing an estimate explanation, in accordance with an implementation.
Figure 4B:
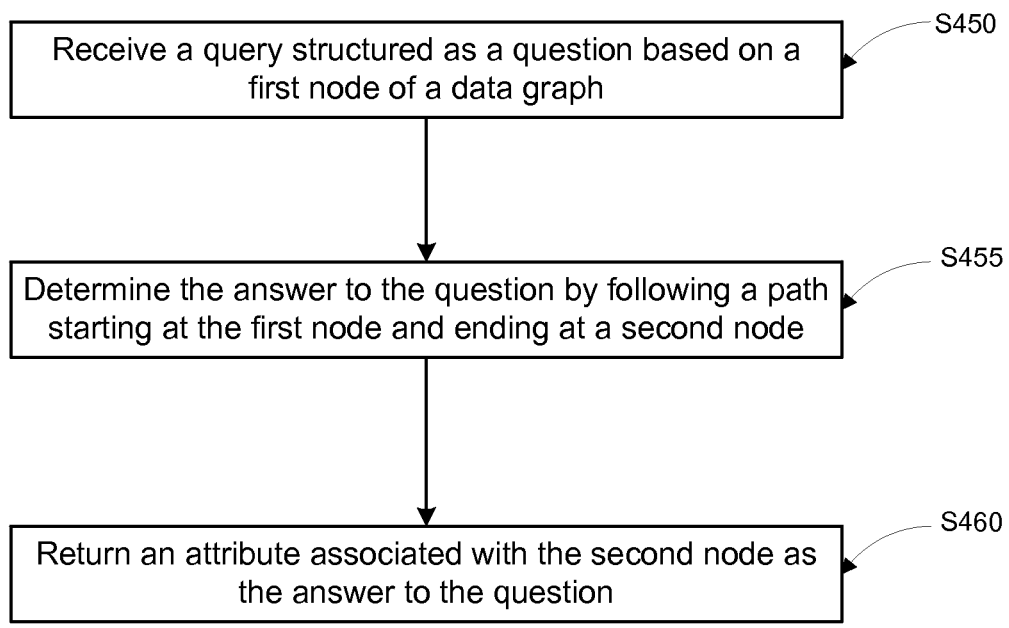
FIG. 4B illustrates a flow diagram of an example process for answering a question, in accordance with an implementation.
Figure 5:
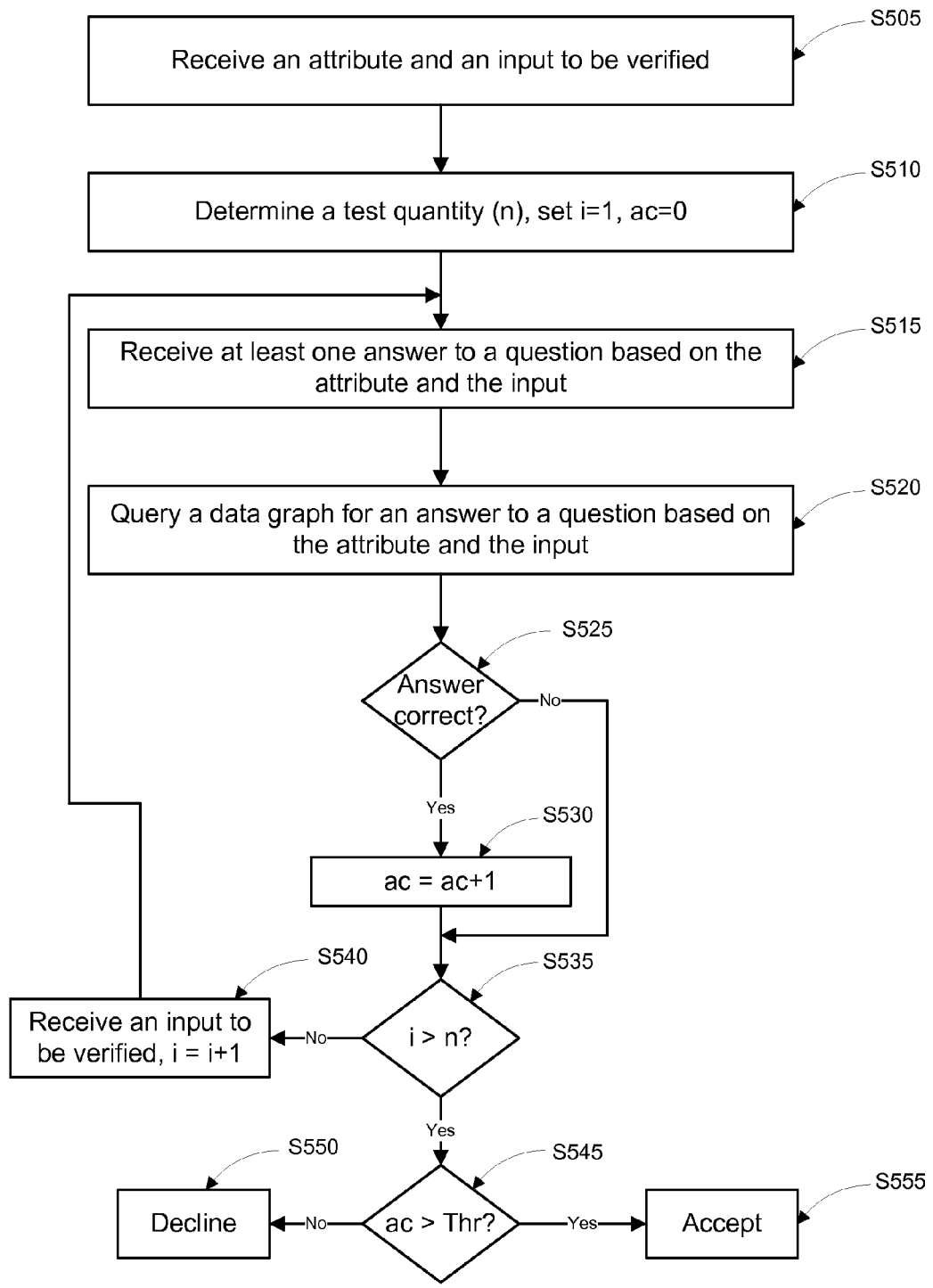
FIG. 5 illustrates a flow diagram of an example process for determining whether an inferred attribute is acceptable, according to an implementation.

FIGS. 4A, 4B and 5 are flowcharts of methods according to example embodiments. The steps described with regard to FIGS. 4A, 4B and 5 may be performed due to the execution of software code stored in a memory associated with an apparatus (e.g., as shown in FIGS. 1, 6 and 7) and executed by at least one processor associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 4A, 4B and 5.

FIG. 4A illustrates a flow diagram of an example process for inferring an attribute, in accordance with an example implementation. As shown in FIG. 4A, in step S405 a semantically structured template sentence ("X is the STRING of Y") is generated based on X and Y (e.g., a first entity (or node) and a second entity (or nodes)), where X and Y are entities (or nodes) that exist in a data graph and the "STRING" represents an attribute that is not assigned to (or absent from) the data graph. For example, X and Y may be variable strings set as entities associated with a person. This allows inferring a relationship from more complex sentences like "X's son, Y, was . . . ", or "X had a son named Y", or "Y was zzz, like his son X".

Accordingly, a semantically structured template sentence in the form X is the "STRING" (e.g., unknown attribute) of Y can be generated allowing a search to infer a relationship that replaces the "STRING" (X is the "grandfather" of Y) which can infer an attribute (that can be inferentially assigned) in the data graph. For example, as discussed above, Ray Boone is the grandparent of Aaron Boone could be a generated semantically structured sentence if Ray Boone and Aaron Boone are entities in the data graph. Other question types or (template) sentence structures are also contemplated. For example, "what is the origin of 'STRING' (e.g., tiramisu may be inferred)", "who was the 'STRING' (e.g., drummer may be inferred) of the Beatles", and the like could be the basis for a semantically structured template sentence.

In step S410 documents associated with the internet are crawled. For example, in one example implementation, the documents associated with crawled documents 120 may be used as crawled documents. In another example implementation a new crawl (or bot) may be initiated. The documents may include any type of file that stores content, such as sound files, video files, text documents, source code, news articles, blogs, web pages, PDF documents, spreadsheets, etc.

In step S415 sentence(s) associated with the document are parsed using the semantically structured sentence. For example, each sentence within the document may be separated into constituents (e.g., word or group of words or phrase that act as a single unit). Then a parse tree can be generated showing the constituents syntactic relation to each other. The parse tree may include semantic and other information showing a relationship between the constituents.

In step S420 a determination is made as to whether X is the attribute of Y. For example, the parse tree can be searched for each of X, Y and the attribute. If any one of X, Y and the attribute are not found, X is not an attribute of Y. If X, Y and the attribute are found, paths associated with the parse tree can be checked to determine if there is a path from X to Y. If there is no path, X is not an attribute of Y. If there is a path from X to Y, X is an attribute of Y. If X is not the attribute of Y, processing continues at step S430. Otherwise, processing continues to S425. Although step S420 is described as using a parse tree to analyze or parse the sentence, other methods of parsing a sentence are within the scope of this disclosure.

In step S425 paths in the data graph that connect X to Y are found. For example, the data graph may be walked or traversed from node to edge to other nodes and across entities to find a path (including nodes and edges) between X and Y. For example, referring to FIG. 2, if the attribute is grandparent, X is Zach Jones and Y is Karina Jones. Beginning at Karina Jones, the child edge is traversed to Carl Jones. Then, the child edge is traversed to Zach Jones. Accordingly, the path is child edge to parent to child edge to grandparent. Although one path is shown in FIG. 2, multiple paths may exist. For example, a sibling edge may exist in the data graph. Accordingly, if Karina Jones had a sister (not shown), a path may exist through Karina Jones' sister to her grandfather because they share the same father.

In step S430 a determination is made as to whether all sentences in the document are parsed. For example, in one implementation a temporary file may be created and each checked sentence may be deleted from the temporary file. Upon determining the file is empty, all sentences have been checked parsed. In another implementation a number of sentences is determined initially and upon determining the number of sentences has been reached (e.g., using a counter), all sentences have been parsed. In another implementation, an end of file marker may be checked. If the next character is an end of file marker, all sentences have been parsed. If all sentences in the document are not parsed, processing returns to step S415. Otherwise, processing continues to step S415.

In step S435 a determination is made as to whether desired documents are parsed. For example, if the crawled documents 120 are used as the document source, a threshold percentage of the documents in the crawled documents 120 being parsed may indicate the desired documents have been parsed. In another embodiment, a threshold number of documents may be parsed. If the desired documents are not parsed, processing returns to step S410. Otherwise processing continues to step S440.

In step S440 an algorithm to represent the attribute is generated based on the best path that connects the X, Y pair. For example, as discussed above, multiple paths may exist between two paths. Accordingly, a path may be selected based on the shortest route, the fastest processing, the likelihood an edge includes valid data (e.g., a date of birth may be more likely to have data than a date of marriage), and the like. Accordingly, a best path may be selected based on one (or more) or some other criteria. Once the best path is selected an algorithm may be generated based on the best path. The best path may be based on a number times that the path repeats (within multiple X, Y pairs), the length of the path, a type of node (or entity) traversed, an abundance of the path relative to shorter paths (e.g., for some X, Y pairs there may be a short path, but for many X, Y pairs the short path does not exist), and the like. For example, the grandparent algorithm may be follow child to node, follow child to node and select last node as grandparent. A grandfather algorithm may add a check for gender equal male. An algorithm may return multiple correct answers. For example, the grandparent algorithm may return four correct answers and the grandfather algorithm may return two correct answers. Accordingly, when used, an algorithm may be executed several times in order to ascertain if there is more than one correct answer.

FIG. 4B illustrates a flow diagram of an example process for answering a question, in accordance with an example implementation. As shown in FIG. 4B, in step S450 a query is received. The query may be structured as a question based on a first entity (or node) of a data graph. The question may be formatted as what/who is the attribute of X. In other words, the question can be formatted in such a way to trigger a search of the data graph for a node and/or entity based on a node and/or entity and the attribute. For example, the question may be who is the grandfather of Karina Jones? This may trigger a search (e.g., using search engine 110) of the data graph. However, there is no information (e.g., entity, node or edge) related to grandfather. In other words, the attribute is absent or not associated with the data graph. Accordingly, the search cannot determine the answer based on a query of the data graph.

In step S455 the answer to the question is determined by following a path starting at the first entity (or node) and ending at a second entity (or node). For example, the answer to the question may be determined by following (e.g., using an algorithm) the path starting at X, and return the answer Y. In example embodiments, the search may further utilize an algorithm corresponding to the attribute and defining the path from the first entity to the second entity. Therefore, the search engine 110 may determine if there is an algorithm associated with the attribute (e.g., grandfather). Once found, the search engine 110 determines the answer of the question (e.g., infers the answer based on the algorithm) using the algorithm and X (e.g., Karina Jones) as the input or starting point. The search engine then may traverse the data graph until Y (e.g., Zach Jones) is found.

In step S460 an attribute associated with the second entity is returned as the answer to the question. For example, a name of a person associated with the second entity as the answer Y. The answer may be returned in order to be displayed in a user interface. For example, the answer may be displayed (or used to generate a display) as shown in FIG. 3.

FIG. 5 illustrates a flow diagram of an example process for determining whether an inferred attribute is acceptable, in accordance with an example implementation. As shown in FIG. 5, in step S505 an attribute and an input to be verified are received. For example, before an algorithm based on an attribute (as described with regard to FIG. 4A) may be stored for use (as described with regard to FIG. 4B), the attribute may be verified. In other words, as a sub-process of step S440 described above, an algorithm based on the attribute may be verified to determine if the algorithm is acceptable. Therefore, the attribute and an input may be received for verification upon generating the algorithm as described above.

In step S510 a system (e.g., system 100) is initialized in that a test quantity (n) is determined, set a number of iterations (or number of times to loop or repeat) to one (i=1) and a number of answers correct to zero (ac=0). The test quantity may be set based on a confidence level. In other words, some number of question/answer tests indicates that an algorithm is acceptable (or unacceptable) based on the results of the test. The test quantity may be statistically based in that the resultant number tested is of statistical significance. The test quantity may be a parameter set by an administrator of the system. Therefore, the test quantity may be read from a memory given the name of the parameter.

In step S515 at least one answer to a question based on the attribute and the input is received. For example, an answer (or more than one answer), determined when the internet was crawled, may be temporarily stored in a memory location corresponding to the question. For example, "Zach Jones" may be stored corresponding to the question "who is Karina Jones' grandparent?". Accordingly, if the input is "Karina Jones" and the attribute is "grandparent", the received answer may be "Zach Jones".

In step S520 a data graph (e.g., data graph 124) is queried for an answer to a question based on the attribute and the input. In example implementations, an algorithm based on the attribute may be used to query the data graph. As discussed above, the algorithm may be used to traverse the data graph. For example, the data graph may be traversed, starting at an entity and/or node representing Karina Jones, using the algorithm. At the end of the traversal, if the algorithm is correct, the entity and/or node should represent Zach Jones.

In step S525 a determination is made as to whether a correct answer was found. For example, who or what the entity and/or node that is found following the query of the data graph is compared to the answer to the question. If a correct answer is found, in step S530 the number of correct answers is iterated by one (ac=ac+1). If a correct answer is not found, the number of correct answers is not iterated. In step S535 a determination is made as to whether a desired number of input, attribute pairs have been verified (i>n?). If not, processing moves to step S540 in order to prepare for a next verification. In step S540 an input to be verified is received and the number of iterations is incremented by one (i=i+1).

In step S545 a determination is made as to whether the number of correct answers is greater than a threshold value (ac>Thr?). For example, the threshold value may be a percentage of correct answers (e.g., 80%, 85%, 95%, and the like) based on a confidence that the algorithm is correct. Alternatively, the threshold value could be a minimum number of correct answers. The number of correct answers can be compared to the threshold value and the determination can be made based on the comparison. If the number of correct answers is greater than the threshold value, in step S555 the attribute is accepted. Otherwise, in step S550 the attribute is declined. Accepting the attribute may include storing the algorithm corresponding to the attribute such that a future search can use the algorithm when a question based on the algorithm is received. For example, the algorithm may be stored in the algorithms 126 with some indication that the algorithm represents the attribute.

FIG. 6 shows an example of a generic computer device 600, which may be operated as system 100, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, e.g., a silicone-based hardware processor, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors.

Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   memory storing:
      a data graph, and
      instructions that, when executed by the at least one processor, cause the system to:
         receive a query based on a first node of the data graph and a fact,
         determine whether the fact is absent from the data graph, and
         upon determining the fact is absent from the data graph:
            determine an answer to the query by following a path starting at the first node and ending at a second node, the path including at least one third node between the first node and the second node, wherein
               the data graph includes a first edge configured to connect the at least one third node with the first node,
               the data graph includes a second edge configured to connect the at least one third node with the second node,
               the path links the first node to the at least one third node via the first edge, and
               the path links the at least one third node to the second node via the second edge, and
            return a property associated with the second node as the answer to the query, the property being linked to the second node via a third edge.

2. The computer system of claim 1, wherein the path is based on an attribute of the first node.

3. The computer system of claim 1, wherein the determining of the answer further includes:
   determining an attribute of the first node associated with the query;
   determining the attribute is absent from the data graph; and
   determining the absent fact based on the path.

4. The computer system of claim 1, wherein
   the query is formatted as a question based on the fact and the first node, and
   the fact links the first node to the second node.

5. The computer system of claim 1, wherein the instructions, when executed by the at least one processor, further cause the system to display the fact associated with the answer.

6. A computer system comprising:
   at least one processor; and
   memory storing:
      a data graph, and
      instructions that, when executed by the at least one processor, cause the system to:
         determine whether a first fact is absent from the data graph, and
         upon determining the first fact is absent from the data graph:
            generate a template sentence based on a second fact including a first node, a second node and a string, wherein the first node and the second node exist in the data graph and the string represents the first fact that is absent from the data graph;

search the internet for a document including the template sentence; and upon determining the internet includes the document with the template sentence:

infer the first fact by generating a series of connections between nodes and edges of the data graph that together with the first node and the second node are configured to represent the first fact, the series of connections defining a path, in the data graph, from the first node to the second node.

7. The computer system of claim 6, wherein the search of the internet for the document includes:

crawling the internet to read a sentence in each of a plurality of documents;

parsing the sentence;

determining if an attribute associated with the first node and an attribute associated with the second node exist in the sentence;

upon determining the attribute associated with the first node and the attribute associated with the second node exist in the sentence, determine if the first node and the second node are linked based on the template sentence; and upon determining the first node and the second node are linked based on the template sentence, the internet is determined to include the document with the template sentence.

8. The computer system of claim 6, wherein the search of the internet for the document includes:

crawling a plurality of documents stored in the memory that are associated with documents on the internet to read a sentence in each of a plurality of documents;

parse the sentence;

determine if the parsed sentence matches the template sentence;

determine if an attribute associated with the first node and an attribute associated with the second node exist in the sentence; and upon determining the parsed sentence matches the template sentence and the attribute associated with the first node and the attribute associated with the second node exist in the sentence, infer the second fact based on the parsed sentence.

9. The computer system of claim 6, wherein the search of the internet for the document includes:

generating a parse tree associated with a sentence read from a document on the internet;

searching the parse tree for the first node and the second node; and determining if the first node and the second node are linked based on the template sentence.

10. The computer system of claim 6, wherein the first fact describes the first node, the second node and an edge absent from the data graph.

11. The computer system of claim 6, further comprising: traversing the data graph to find a plurality of paths from the first node to the second node; and selecting one of the plurality of paths as the path.

12. The computer system of claim 11, wherein selecting the path is based on at least one of a number times that the path repeats, a length of the path, a type of node traversed, and an abundance of the path relative to shorter paths.

13. The computer system of claim 6, wherein the document includes a file that stores content.

14. The computer system of claim 6, further comprising verifying the series of connections using a query based on the first fact and one of the first node and the second node.

15. The computer system of claim 6, further comprising:

first receiving a query based on the first fact;

second receiving one of the first node and the second node as a variable associated with the query;

third receiving the other of the first node and the second node as an answer to the query;

traversing the data graph using the series of connections to determine if the answer to the query is the other of the first node and the second node;

repeating the second receiving, the third receiving and the traversing steps a number of times; and verifying the series of connections between nodes and edges of the data graph as acceptable if the answer to the query is the other of the first node and the second node is at least a threshold number.

16. The computer system of claim 6, further comprising:

receiving a query based on the first fact including one of the first node and the second node from an external system;

determining if the first fact exists in the data graph; and upon determining the first fact does not exist in the data graph, returning an answer using the series of connections.

17. A method comprising:

determining whether an edge is absent from a data graph; and upon determining the edge is absent from the data graph:

generating a template sentence based on a fact including a first node, a second node and a string, wherein the first node and the second node exist in the data graph and the string represents the edge that is absent from the data graph;

searching the internet for a document including the template sentence;

upon determining the template sentence is in the document, determine a relationship between the first node and the second node; and inferring the edge based on the relationship by generating a series of connections between nodes and edges of the data graph that together with the first node and the second node are configured to represent the fact, the series of connections defining a path, in the data graph, from the first node to the second node.

18. The method of claim 17, wherein the search of the internet for the document includes:

crawling at least one of the internet and a plurality of documents stored in a memory that are associated with documents on the internet to read at least one sentence;

parsing the sentence;

determining if the parsed sentence matches the template sentence;

determining if an attribute associated with the first node and an attribute associated with the second node exist in the sentence; and upon determining the parsed sentence matches the template sentence and the attribute associated with the first node and the attribute associated with the second node exist in the sentence, determining if the first node and the second node are linked by an attribute based on the fact.

19. The method of claim 17, further comprising:
   traversing the data graph to find a plurality of paths from the first node to the second node; and
   selecting one of the plurality of paths as the path.

* * * * *